United States Patent Office 3,403,304
Patented Sept. 24, 1968

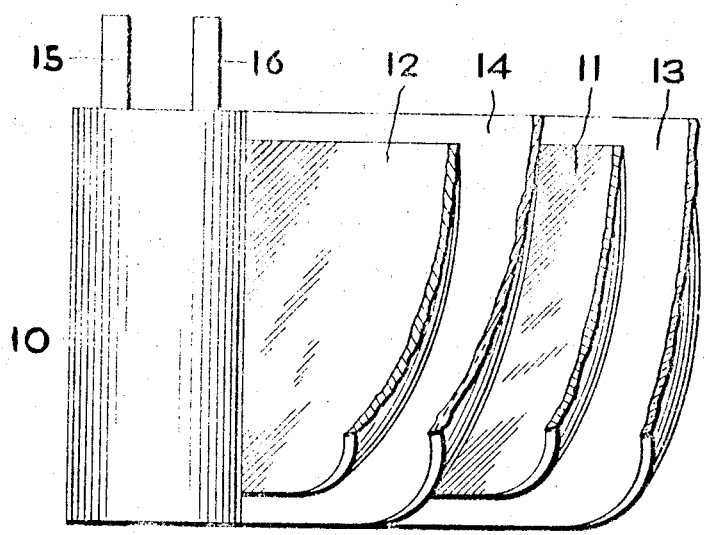

---

3,403,304
ELECTROLYTIC CAPACITOR WITH AN ELECTROLYTE OF AN AMMONIUM ORGANO-BORON COMPOUND
Sidney D. Ross, Williamstown, Raymond C. Petersen, North Adams, and Manuel Finkelstein, Williamstown, Mass., assignors to Sprague Electric Company, North Adams, Mass., a corporation of Massachusetts
Filed Feb. 7, 1966, Ser. No. 525,624
7 Claims. (Cl. 317—230)

ABSTRACT OF THE DISCLOSURE

An electrolytic capacitor, with at least one electrode of film-forming metal, has a quaternary ammonium di-organo-boron compound of high purity constitiuting the solute in the electrolyte. The solvent may be any one or a mixture of such solvents as water, glycols, formamide, dimethylformamide and the like.

---

The present invention relates to new chemical compounds, electrolytic capacitors containing the same and more particularly to compounds having the following formulas:

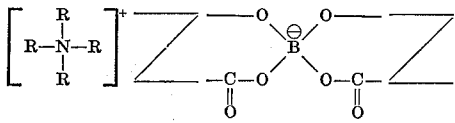

and

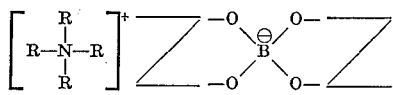

wherein the R groups are any combination of $C_1$–$C_{18}$ hydrocarbyl groups; and Z is an ortho disubstituted benzene ring, or a 1, 2 or 2, 3 disubstituted naphthalene ring.

The quaternary ammonium compounds of the present invention have utility as the electrolyte solute of electrical capacitor electrolytes. They are crystalline compounds of high purity and have excellent solubility characteristics in a variety of solvents.

The following examples in which parts and percentages are by weight unless otherwise stated, illustrate the more detailed practice of the invention but are not to be construed as limitative. The salts prepared in these examples were analyzed for nitrogen by the Kjeldahl method and for carbon and hydrogen by standard combustion techniques.

The accompanying drawing depicts an electrolytic capacitor within the scope of this invention.

Example I.—Tetramethylammonium borodisalicylate

A mixture of salicylic acid (0.2 mole) boric acid (0.1 mole), and tetramethylammonium hydroxide (0.1 mole, as a 10% aqueous solution) was heated until the solution was homogeneous. The water was removed in vacuo and the product was crystallized two times from 2-propanol. The initial melting point was 164–167° C.; yield was 85%. Additional crystallization raised the melting point to 169–172° C.

Analysis.—Calculated for $C_{18}H_{20}BNO_6$: Theoretical, C, 60.50; H, 5.64; B, 3.03; N, 3.92. Found: C, 59.93; H, 5.70; B, 3.02; N, 3.63.

The following structure has been proved for this compound:

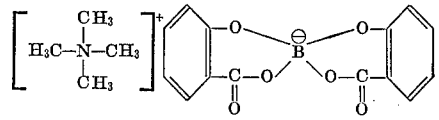

Following the same general procedure tetraethylammonium borodisalicylate and benzyltrimethylammonium borodisalicylate were formed.

Example II.—Benzyltrimethylammonium borodi (2-hydroxy-1-naphthoate)

To a hot, filtered solution of 2-hydroxy-1-naphthoic acid (0.1 mole) in ethanol were added successively a solution of boric acid (0.05 mole) in hot water and benzyltrimethylammonium hydroxide (42 gms. of a 40% solution in methanol). Some methanol was added and the mixture was heated to solution.

On cooling, addition of ether, and scratching, the product 12 gms. (45%) of an off white solid was obtained. After crystallization from a 2-propanol-water mixture and washing with acetone, the product had a melting point of 185–187° C.

Analysis.—Calculated for $C_{32}H_{28}BNO_6$: Theoretical: N, 2.63. Found: N, 2.58.

The following structure has been proved for this compound:

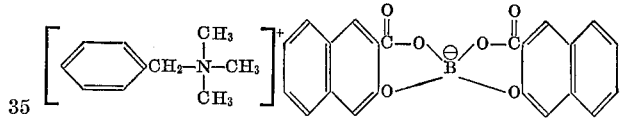

Following the same general procedure the following compounds were formed: tetraethylammonium borodi (3 hydroxy-2 napthoate); tetraethylammonium borodi (1-hydroxy-2-naphthoate); and tetraethylammonium borodi-(2-hydroxy-1-naphthoate).

Example III.—Tetramethylammonium borodicatecholate

A mixture of catechol (0.15 mole), boric acid (0.25 mole) and tetramethylammonium hydroxide (0.25 mole as a 10% aqueous solution) was heated to solution. Water was removed by a water pump. The product was crystallized from an isopropyl alcohol-methanol mixture; yield was 71.7%. Recrystallized from an isopropyl alcohol-methanol-ethyl ether mixture, the melting point was 288–290° C.

Analysis.—Calculated for $C_{16}H_{20}BNO_4$, M. W. 301.15. Theoretical: C, 63.81; H, 6.69; B, 3.59; N, 4.65. Found: N, 4.34.

The following structure has been proved for this compound:

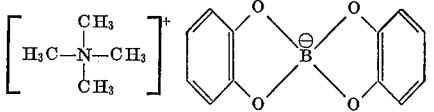

In a like manner the tetrahydrocarbyl-ammonium salt of the bisdiolborate of 1, 2 or 2, 3 dihydroxy naphthalene may be formed. These compounds have the following structure:

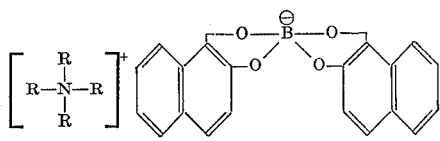

and

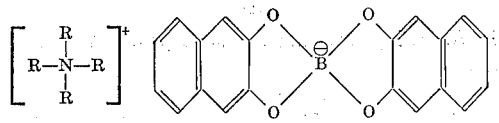

wherein R is as represented above.

The aryl radicals of the compounds of the present invention may have one or more noninterfering substituents thereon to add various characteristics to or improve various characteristics of the compounds. For example, a long chain alkyl group would improve the solubility characteristics in organic solvents.

The following examples serve to illustrate the utility of the subject compounds as effective electrolyte solutes.

Example IV

An electrolyte was prepared by dissolving 4% of tetramethylammonium borodicatecholate in dimethylformamide. Two groups of cemmercial aluminum foil 5 volt and 75 volt capacitance sections were impregnated with this electrolyte. The following table gives life test data obtained at 125° C. The values given are averages of 5 units of each rating.

| Hours | 5 volt | | | 75 volt | | |
|---|---|---|---|---|---|---|
| | Capacitance | RxC | I (μa) | Capacitance | RxC | I(μa) |
| 0 | 237 | 149 | 0.8 | 35.3 | 42 | 3.3 |
| 500 | 228 | 145 | 0.7 | 35.1 | 44 | 0.5 |
| 1,000 | 224 | 139 | 1.0 | 35.1 | 47 | 1.8 |
| 2,000 | 220 | 132 | 0.7 | 34.8 | 52 | 1.5 |

The foregoing data indicate the capacitors are electrically stable and improve somewhat with time from a leakage current standpoint.

Example V

An electrolyte was prepared by dissolving 8% of benzyltrimethylammonium borodisalicylate in dimethylformamide. A group of commercial aluminum foil 50 volt units was impregnated with this electrolyte. The following life test data was obtained at 85° C. The values given are the averages for 5 units.

| Hours | 50 volt | | |
|---|---|---|---|
| | Capacitance | RxC | I (μa) |
| 0 | 77.5 | 30 | 1.8 |
| 500 | 77.2 | 32 | 0.7 |
| 1,000 | 77.0 | 33 | 0.9 |
| 2,000 | 76.5 | 34 | 0.7 |

As in the previous example, the results indicate electrical stability with a good improvement in leakage current over the duration of the test period.

Reference is made to the appended drawing in which capacitance section 10 is shown in partly unrolled condition. Anode 11 is of a valve metal having on its surface an insulating oxide layer. Cathode 12 may also be a valve metal or of a metal like silver. Electrolyte absorbent films 13 and 14 are positioned between the anode and cathode. Tabs 15 and 16 are connected to electrodes 11 and 12 respectively to function as terminals for the capacitance section.

The electrolyte systems contemplated herein are not limited to those wherein the solvent is dimethylformamide since other solvents and mixtures of solvents may be employed. For example, water, formamide, the glycols, etc. and mixtures thereof may be employed. It is also to be understood that the electrolytes of the present invention have utility in capacitors other than aluminum e.g. tantalum, etc.

Since it is obvious that many changes and modifications can be made in the above-described details without departing from the nature and spirit of the invention it is to be understood that the invention is not limited to said details except as set forth in the appended claims.

What is claimed is:

1. An electrolytic capacitor comprising a capacitance section having a plurality of electrodes, at least one electrode being a valve metal having on its surface an insulating oxide layer, said section being impregnated with an electrolyte consisting essentially of a solvent having dissolved therein a compound having a formula selected from the group consisting of

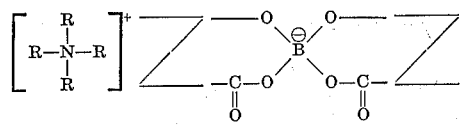

and

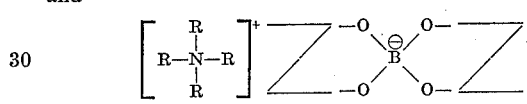

wherein the R groups are any combination of $C_1$–$C_{18}$ hydrocarbyl groups and Z is an ortho disubstituted benzene ring, or a 1, 2 or 2, 3 disubstituted naphthalene ring.

2. The capacitor of claim 1 wherein said compound is selected from the group consisting of
   Tetramethylammonium borodisalicylate,
   Tetraethylammonium, borodisalicylate,
   Benzyltrimethylammonium borodisalicylate,
   Benzyltrimethylammonium borodi (2-hydroxy-1-naphthoate),
   Tetraethylammonium borodi (3-hydroxy-2-naphthoate),
   Tetraethylammonium borodi (1-hydroxy-2-naphthoate),
   Tetraethylammonium borodi (2-hydroxy-1-naphthoate),
   Tetramethylammonium borodicatecholate;
   The tetra $C_1$–$C_{18}$ hydrocarbylammonium salt of the bisdiolborate of 1, 2 dihydroxy naphthalene, and
   The tetra $C_1$–$C_{18}$ hydrocarbylammonium salt of the bisdiolborate of 2, 3 dihydroxy naphthalene.

3. The capacitor of claim 2 wherein said compound is tetramethylammonium borodisalicylate.

4. The capacitor of claim 2 wherein said compound is tetraethylammonium borodisalicylate.

5. The capacitor of claim 2 wherein said compound is benzyltrimethylammonium borodisalicylate.

6. The capacitor of claim 2 wherein said compound is tetramethylammonium borodicatecholate.

7. The capacitor of claim 2 wherein said compound is the tetra $C_1$–$C_{18}$ hydrocarbylammonium salt of the bisdiolborate of 2, 3 dihydroxy naphthalene.

References Cited

UNITED STATES PATENTS

| 1,976,700 | 10/1934 | Lilienfeld | 317—230 |
| 3,009,941 | 11/1961 | Brotherton | 260—462 |

JAMES D. KALLAM, *Primary Examiner.*